(12) United States Patent
Hirakawa et al.

(10) Patent No.: US 7,638,196 B2
(45) Date of Patent: *Dec. 29, 2009

(54) CONDUCTIVE RUBBER MEMBER

(75) Inventors: Naoki Hirakawa, Yokohama (JP);
Junya Hoshi, Yokohama (JP)

(73) Assignee: Synztec Co., Ltd., Kanagawa (JP)

( * ) Notice: Subject to any disclaimer, the term of this patent is extended or adjusted under 35 U.S.C. 154(b) by 177 days.

This patent is subject to a terminal disclaimer.

(21) Appl. No.: 11/599,407

(22) Filed: Nov. 15, 2006

(65) Prior Publication Data

US 2007/0110936 A1  May 17, 2007

(30) Foreign Application Priority Data

Nov. 16, 2005 (JP) ............... 2005-332109
Oct. 17, 2006 (JP) ............... 2006-282168

(51) Int. Cl.
*B32B 25/16* (2006.01)
*B32B 27/24* (2006.01)

(52) U.S. Cl. ................. 428/413; 428/421; 428/447; 428/521

(58) Field of Classification Search ........... None
See application file for complete search history.

(56) References Cited

U.S. PATENT DOCUMENTS

| | | | |
|---|---|---|---|
| 5,471,285 A | 11/1995 | Nagase et al. | |
| 5,733,235 A * | 3/1998 | Waku et al. | 492/25 |
| 6,400,919 B1 | 6/2002 | Inoue et al. | |
| 6,534,180 B2 | 3/2003 | Hoshi | |
| 6,558,781 B1 | 5/2003 | Fuei et al. | |
| 2001/0055687 A1 * | 12/2001 | Hoshi | 428/423.9 |
| 2007/0104906 A1 * | 5/2007 | Hirakawa et al. | 428/36.8 |
| 2007/0110936 A1 | 5/2007 | Hirakawa et al. | |
| 2007/0149377 A1 | 6/2007 | Motokawa et al. | |

FOREIGN PATENT DOCUMENTS

| | | |
|---|---|---|
| JP | 04-214579 A | 8/1992 |
| JP | 05-158341 A | 6/1993 |
| JP | 05-281831 A | 10/1993 |
| JP | 06-175470 A | 6/1994 |
| JP | 2002-040760 A | 2/2002 |
| JP | P3444391 B2 | 6/2003 |
| JP | 2004-191659 A | 7/2004 |
| JP | 2004-191686 A | 7/2004 |
| JP | 2005-283913 A | 10/2005 |
| JP | 2007-031703 A | 2/2007 |

* cited by examiner

*Primary Examiner*—Ramsey Zacharia
(74) *Attorney, Agent, or Firm*—Sughrue Mion, PLLC

(57) ABSTRACT

A conductive rubber member having at least one conductive elastic layer, wherein the conductive elastic layer, which is at least an outermost layer, in contact with an opposing member during use is a curing product of a rubber composition having a conductivity imparting agent incorporated into a rubber base material containing acrylonitrile-butadiene rubber (NBR); and a superficial portion of the conductive elastic layer is a surface treatment layer formed by impregnating the conductive elastic layer with a surface treating solution containing at least an isocyanate component and an organic solvent.

7 Claims, 1 Drawing Sheet

CONDUCTIVE RUBBER MEMBER

The entire disclosure of Japanese Patent Applications Nos. 2005-332109 filed Nov. 16, 2005 and 2006-282168 filed Oct. 17, 2006 is expressly incorporated by reference herein.

BACKGROUND OF THE INVENTION

1. Field of the Invention

This invention relates to a conductive rubber member particularly preferred for a conductive roll or blade which is used to impart a uniform electrostatic charge to a photoconductor of an image forming apparatus such as an electrophotographic copier or printer, or a toner jet copier or printer.

2. Description of the Related Art

A conductive roll of an image forming apparatus such as an electrophotographic copier or printer is required to have non-staining properties and electrical conductivity toward a photoconductor or the like. Thus, conductive rolls formed from polyurethane or silicone rubber have been used. Because of staining properties or electrostatic properties toward a photoconductor or the like, however, proposals have been made for conductive rolls provided with various coating layers, surface treatment layers, or coating tubes on the surfaces of various elastic layers (see, for example, Japanese Unexamined Patent Publication No. 1994-175470 (claims); Japanese Unexamined Patent Publication No. 1993-281831 (claims); Japanese Unexamined Patent Publication No. 1992-214579 (claim 2, [0022], etc.); and Japanese Unexamined Patent Publication No. 2002-040760 (claims)).

Of these prior art documents, Japanese Unexamined Patent Publication No. 2002-040760 (claims) discloses a charging member for which the applicant of the present application filed the application as a low-cost charging member capable of maintaining satisfactory characteristics for a long term. The charging member has an elastic layer comprising an epichlorohydrin rubber base material, and has a surface treatment layer formed by surface treatment with a surface treating solution containing at least one polymer selected from acrylic fluoropolymers and acrylic silicone polymers, a conductivity imparting agent, and an isocyanate component.

To improve the characteristics of a charging roll, the applicant proposed a charging roll having a surface treatment layer obtained by surface treating a rubber layer comprising epichlorohydrin rubber with a surface treating solution containing an isocyanate compound (see Japanese Patent No. 3444391).

However, epichlorohydrin rubber is defective in that its processability is poor. Thus, it is difficult to perform extrusion or injection molding of epichlorohydrin rubber which leads to improved productivity or cost reduction. Even if a plasticizer, a processing aid (factice), etc. are added in large amounts, advanced shaping techniques or various contrivances are required. As a result, a considerably advanced contrivance has been needed to obtain excellent roll characteristics (staining resistance, surface properties, compression set).

The present invention has been accomplished in the light of the above-mentioned circumstances. It is an object of the present invention to provide a conductive rubber member which has excellent processability, which is used in contact with a photoconductor without damaging the surface of the photoconductor or undergoing wear of the surface of the rubber member, which entails a low cost, which can maintain satisfactory characteristics for a long term, and which is particularly preferred for a conductive roll or blade.

SUMMARY OF THE INVENTION

A first aspect of the present invention, for attaining the above object, is a conductive rubber member having at least one conductive elastic layer, wherein the conductive elastic layer, which is at least an outermost layer, in contact with an opposing member during use is a curing product of a rubber composition having a conductivity imparting agent incorporated into a rubber base material containing acrylonitrile-butadiene rubber (NBR), and a superficial portion of the conductive elastic layer is a surface treatment layer formed by impregnating the conductive elastic layer with a surface treating solution containing at least an isocyanate component and an organic solvent.

A second aspect of the present invention is the conductive rubber member according to the first aspect, wherein the rubber base material comprises acrylonitrile-butadiene rubber (NBR) blended with epichlorohydrin rubber.

A third aspect of the present invention is the conductive rubber member according to the first or second aspect, wherein the surface treating solution further contains at least one of carbon black and at least one polymer selected from an acrylic fluoropolymer and an acrylic silicone polymer.

A fourth aspect of the present invention is the conductive rubber member according to any one of the first to third aspects, wherein the surface treating solution further contains a polyether-based polymer.

A fifth aspect of the present invention is the conductive rubber member according to the fourth aspect, wherein the polyether-based polymer has active hydrogen.

A sixth aspect of the present invention is the conductive rubber member according to the fifth aspect, wherein the polyether-based polymer is epichlorohydrin rubber.

A seventh aspect of the present invention is the conductive rubber member according to any one of the first to sixth aspects, wherein the conductivity imparting agent is at least one of an electronic conductivity imparting agent and an ionic conductivity imparting agent.

An eighth aspect of the present invention is the conductive rubber member according to any one of the first to seventh aspects, which is roll-shaped or blade-shaped.

According to the present invention, it is possible to provide a conductive rubber member which has excellent processability, which has a surface treatment layer integrated with its superficial portion, which, even when used as a member, particularly, in contact with a photoconductor, neither stains the surface of the photoconductor nor causes wear of the surface of a roll or the tip of a blade, which entails a low cost, and which can maintain satisfactory characteristics for a long term.

BRIEF DESCRIPTION OF THE DRAWINGS

For a more complete understanding of the present invention and the advantages thereof, reference is now made to the following descriptions in conjunction with the accompanying drawings.

DESCRIPTION OF THE PREFERRED EMBODIMENTS

The present invention will now be described in detail with reference to drawings illustrating a conductive roll as an example of a conductive rubber member according to the present invention.

Figure 1A:
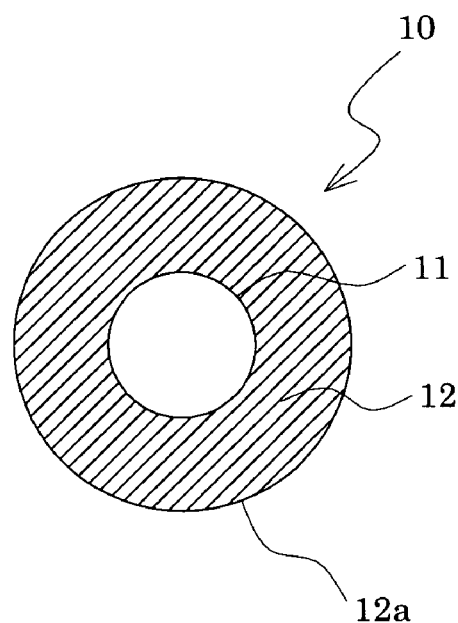
FIGS. 1A and 1B are sectional views of a conductive roll according to the present invention.
Figure 1B:
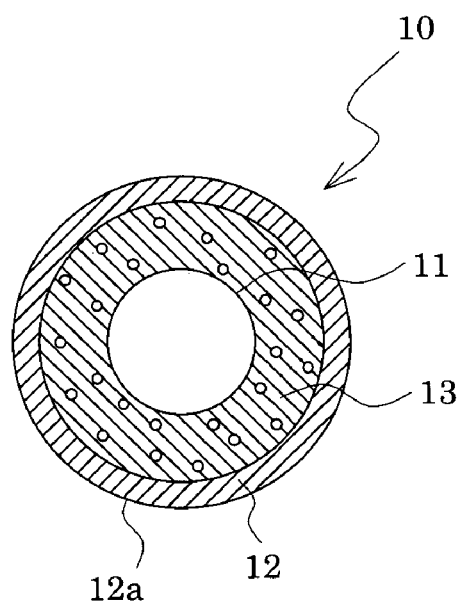

FIGS. 1A and 1B show sectional views of a conductive roll as an example of a conductive rubber member according to the present invention. As shown in FIG. 1A, a conductive roll 10 has an elastic layer 12 on a core metal 11, the elastic layer 12 comprising a matrix containing acrylonitrile-butadiene rubber (NBR). A superficial portion of the elastic layer 12 is a surface treatment layer 12a. As shown in FIG. 1B, the conductive roll 10 may have, for example, a foamed layer 13 between the core metal 11 and the elastic layer 12 comprising the matrix containing acrylonitrile-butadiene rubber (NBR). Here, the layer optionally provided between the elastic layer 12 comprising the matrix and the core metal 11 may be a foamed layer or an unfoamed layer, or may have a structure composed of one or more layers. In this case, the elastic layer as the uppermost layer may fulfill the conditions described below. Needless to say, the elastic layer 12 may be solid (unfoamed) or spongy (a foam).

The elastic layer 12 of the conductive roll 10 according to the present invention comprises the matrix containing acrylonitrile-butadiene rubber (NBR), as stated above. This matrix is produced by curing a rubber base material containing acrylonitrile-butadiene rubber (NBR). The acrylonitrile-butadiene rubber (NBR) is not limited, and includes hydrogenated NBR. The rubber base material may be a blend containing other rubber material, as desired, if the rubber base material consists essentially of acrylonitrile-butadiene rubber (NBR). Examples of the rubber material which can be blended are polyurethane, epichlorohydrin rubber, chloroprene rubber (CR), and styrene rubber (SBR). In particular, epichlorohydrin rubber is preferred in order to impart conductivity to the elastic layer. Examples of the epichlorohydrin rubber are epichlorohydrin homopolymer, epichlorohydrin-ethylene oxide copolymer, epichlorohydrin-allyl glycidyl ether copolymer, and epichlorohydrin-ethyleneoxide-allyl glycidyl ether terpolymer.

The elastic layer 12 needs to incorporate a conductivity imparting agent. That is, the matrix (elastic layer 12) is produced by curing a rubber composition having the conductivity imparting agent added to the rubber base material. As the conductivity imparting agent, there can be used an electronic conductivity imparting agent such as carbon black or a metal powder, an ionic conductivity imparting agent, or a mixture of these. Examples of the ionic conductivity imparting agent are organic salts, inorganic salts, metal complexes, and ionic liquids. The organic salts and the inorganic salts include, for example, lithium perchlorate, quaternary ammonium salts, and sodium trifluoroacetate. The metal complexes include, for example, ferric halides-ethylene glycol. Concrete examples are described in Japanese Patent No. 3655364. The ionic liquids are molten salts which are liquid at room temperature. They are also called cold molten salts, and particularly refer to those having a melting point of 70° C. or lower, preferably 30° C. or lower. Concrete examples are described in Japanese Unexamined Patent Publication No. 2003-202722.

The above elastic layer 12 is easily shaped by injection molding, extrusion, or the like, because the processability of the matrix containing acrylonitrile-butadiene rubber (NBR) is satisfactory.

The elastic layer 12 may have an outer surface polished or non-polished after its shaping.

The surface treatment layer 12a can be formed by dipping the elastic layer 12 in a surface treating solution, or coating the elastic layer 12 with a surface treating solution by spray coating or the like, followed by drying for hardening. A superficial portion of the elastic layer 12 is impregnated with the surface treating solution to become the surface treatment layer 12a.

The surface treating solution is formed by dissolving, at least, an isocyanate component in an organic solvent.

Examples of the isocyanate component contained in the surface treating solution are isocyanate compounds, such as 2,6-tolylene diisocyanate (TDI), 4,4'-diphenylmethane diisocyanate (MDI), p-phenylene diisocyanate (PPDI), 1,5-naphthalene diisocyanate (NDI), and 3,3-dimethyldiphenyl-4,4'-diisocyanate (TODI), and their polymers and modification products. Further examples are prepolymers comprising polyols and isocyanates.

Moreover, a polyether-based polymer may be contained in the surface treating solution. The polyether-based polymer is preferably one soluble in an organic solvent, and is preferably one which has active hydrogen and reacts with the isocyanate compound, whereby it can be chemically bound thereto.

Examples of the preferred polyether-based polymer having active hydrogen include epichlorohydrin rubber. The epichlorohydrin rubber refers to the unvulcanized one. The epichlorohydrin rubber is preferred, because it can impart elasticity as well as conductivity to the surface treatment layer. The epichlorohydrin rubber has active hydrogen (hydroxyl group) at the terminal, but the one having active hydrogen, such as a hydroxyl group or an allyl group, in the unit is also preferred. Examples of the epichlorohydrin rubber are epichlorohydrin homopolymer, epichlorohydrin-ethylene oxide copolymer, epichlorohydrin-allyl glycidyl ether copolymer, epichlorohydrin-ethylene oxide-allyl glycidyl ether terpolymer, and derivatives of these.

As other preferred polyether-based polymers having active hydrogen, polymers having a hydroxyl group or an allyl group are named, and polyols and glycols, for example, are included. Such polyether-based polymers are preferably those having an active hydrogen-containing group only at one terminal, rather than at both terminals. Those having a number average molecular weight of 300 to 1000 are preferred, because they can impart elasticity to the surface treatment layer. Examples of such polyether-based polymers are polyalkylene glycol monomethyl ethers, polyalkylene glycol dimethyl ethers, allylated polyethers, polyalkylene glycol diols, and polyalkylene glycol triols.

By so adding the polyether-based polymer to the surface treating solution, the flexibility and strength of the surface treatment layer are increased. This eliminates the risk of wearing the surface of the desired roll, or damaging the surface of the photoconductor in contact.

The surface treating solution may also incorporate a polymer selected from acrylic fluoropolymers and acrylic silicone polymers.

The acrylic fluoropolymer or the acrylic silicone polymer used in the surface treating solution of the present invention is that which is soluble in a predetermined solvent, reacts with the isocyanate compound, and can be chemically bound to the isocyanate compound thereby. The acrylic fluoropolymer is, for example, a solvent-soluble fluoropolymer having a hydroxyl group, an alkyl group or a carboxyl group, and its examples are block copolymers of acrylic esters and fluoroalkyl acrylates, or their derivatives. The acrylic silicone polymer is, for example, a solvent-soluble silicone polymer, and its examples are block copolymers of acrylic esters and acrylic acid siloxane ester, or their derivatives.

To the surface treating solution, carbon black such as acetylene black, KETJENBLAK or TOKABLACK may be further added as the conductivity imparting agent.

The carbon black used in the surface treating solution is preferably in a proportion of 0 to 40% by mass based on the isocyanate component. Too high a carbon back content is not preferred, because it poses problems such as detachment or deterioration of physical properties.

The total content of the acrylic fluoropolymer and the acrylic silicone polymer in the surface treating solution is preferably 10 to 70% by mass based on the isocyanate component. If this content is less than 10% by mass, the effect of retaining carbon black or the like in the surface treatment layer is diminished. If the polymer content is more than 70% by mass, there occurs the problem that the electrical resistance value of the charging roll increases, and its discharge characteristics decline, or the problem that the content of the isocyanate component becomes relatively low, thus making it impossible to form an effective surface treatment layer.

Further, the surface treating solution contains an organic solvent which dissolves the isocyanate component, and optionally contained the polyether-based polymer, the acrylic fluoropolymer and the acrylic silicone polymer. The organic solvent is not limited, but an organic solvent such as ethyl acetate, methyl ethyl ketone (MEK), or toluene may be used.

In the present invention, the superficial portion of the elastic layer 12 is impregnated with the surface treating solution, followed by hardening the impregnated solution, to provide the surface treatment layer 12a. In this manner, the surface treatment layer 12a is provided integrally with the surface layer of the elastic layer 12 upon impregnation. This surface treatment layer 12a is formed by curing, mainly, the isocyanate component, and is integrally formed such that the density of the isocyanate component becomes gradually lowers from the surface toward the interior. As a result, bleeding of a contaminant, such as a plasticizer, into the surface of the conductive roll can be prevented, thus providing a conductive roll excellent in resistance to staining of the photoconductor.

The layer optionally provided between the core metal 11 and the elastic layer 12 is, for example, a foam, an example of which is a nitrile rubber foam, particularly, a moderately high nitrile content rubber or a high nitrile content rubber. In order to fulfill the conductivity required of the charging roll, it is necessary to add a sufficient amount of the conductivity imparting agent to the foamed layer. However, the addition of the conductivity imparting agent increases hardness, failing to obtain an adequate nip. If the amount of the plasticizer added is rendered large to give low hardness, the plasticizer migrates to the outer surface of the charging roll, thereby staining the photoconductor in contact with the charging roll, and also posing difficulty in foaming intended to impart low hardness. Thus, it is preferable to use a nitrile rubber foam which has low gas permeability and ensures high foaming. The foamed layer may have closed cells or open cells.

The conductive rubber member according to the present invention is preferred for use in, for example, a conductive roll or blade.

EXAMPLES

The present invention will be described in further detail based on the following examples, but is in no way limited to these examples.

Example 1

Production of Roll

To 100 parts by mass of moderately high nitrile content type acrylonitrile-butadiene rubber, 10 parts by mass of TOKABLACK #5500 (TOKAI CARBON), 25 parts by mass of ASAHI THERMAL, 1.5 parts by mass of Sanceler TET (SANSHIN CHEMICAL INDUSTRY), 1.5 parts by mass of Sanceler CZ (SANSHIN CHEMICAL INDUSTRY), and 1.0 part by mass of sulfur were added, and the mixture was kneaded by a roll mixer. The kneaded materials were extruded onto a φ6 mm shaft, and then the extrudate was cured (160° C.×30 min) to form a rubber roll having an inner diameter of φ6 mm and an outer diameter of φ10 mm.

Preparation of Surface Treating Solution:

To 100 parts by mass of ethyl acetate, 10 parts by mass of an isocyanate compound (MDI) was added, followed by mixing and dissolving, to prepare a surface treating solution.

Surface Treatment of Roll:

With the surface treating solution being held at 23° C., the above roll was dipped therein for 60 seconds, whereafter the roll was heated for 1 hour in an oven held at 120° C. to provide a conductive roll of Example 1 which had a surface treatment layer.

Example 2

Ethyl acetate (100 parts by mass), 4 parts by mass of acetylene black (DENKI KAGAKU KOGYO), and 2 parts by mass of an acrylic silicone polymer (MODIPER FS700, NOF CORPORATION) were dispersed and mixed for 3 hours in a ball mill. Then, 20 parts by mass of an isocyanate compound (MDI) was added, followed by mixing and dissolving, to prepare a surface treating solution. On the surface of the elastic layer of the same rubber roll as that in Example 1, a surface treatment layer was formed using the surface treating solution, whereby a conductive roll of Example 2 was provided.

Example 3

Production of Roll

To 100 parts by mass of moderately high nitrile content type acrylonitrile-butadiene rubber, 5 parts by mass of acetylene black (DENKI KAGAKU KOGYO), 1 part by mass of tetraethylammonium perchlorate (KANTO CHEMICAL), 5 parts by mass of factice (Brown PR, TENMAFACTICE MFG.), 15 parts by mass of di(2-ethylhexyl) phthalate (DOP), 1.5 parts by mass of Sanceler TET (SANSHIN CHEMICAL INDUSTRY), 1.5 parts by mass of Sanceler CZ (SANSHIN CHEMICAL INDUSTRY), and 1.0 part by mass of sulfur were added, and the mixture was kneaded by a roll mixer. The kneaded materials were injection molded by a pipe mold having a φ6 mm shaft set therein, and then the molded product was cured (160° C.×30 min) to form a rubber roll having an inner diameter of φ6 mm and an outer diameter of φ10 mm.

Preparation of Surface Treating Solution:

Ethyl acetate (100 parts by mass), 2 parts by mass of acetylene black (DENKI KAGAKU KOGYO), and 1 part by mass of an acrylic fluoropolymer (MODIPER 600, NOF CORPORATION) were dispersed and mixed for 3 hours in a ball mill. Then, 10 parts by mass of an isocyanate compound (MDI) was added, followed by mixing and dissolving, to prepare a surface treating solution.

Surface Treatment of Roll:

With the surface treating solution being kept at 23° C., the surface of the above roll was sprayed with the surface treating solution twice by a spray to impregnate the roll (elastic layer) with the surface treating solution. The thus treated roll was heated for 1 hour in an oven held at 120° C. to provide a conductive roll of Example 3 which had a surface treatment layer.

Example 4

A conductive roll of Example 4 was produced in the same manner as in Example 3, except that the moderately high nitrile content type acrylonitrile-butadiene rubber was used in an amount of 70 parts by mass, and 30 parts by mass of epichlorohydrin rubber (EPICHLOMER-CG-102; DAISO) was incorporated.

Example 5

A conductive roll of Example 5 was produced in the same manner as in Example 4, except that the surface treating solution further incorporated 3 parts by mass of epichlorohydrin rubber (EPICHLOMER-C; DAISO).

Example 6

A conductive roll of Example 6 was produced in the same manner as in Example 5, except that the outer surface of the injection molded roll was polished.

Comparative Example 1

A conductive roll of Comparative Example 1 was produced in the same manner as in Example 1, except that the surface treatment with the isocyanate solution was not carried out.

Comparative Example 2

A conductive roll of Comparative Example 2 was produced in the same manner as in Example 1, except that a coating layer was formed on the surface of the elastic layer of the rubber roll with the use of a urethane coating material (Neo-Rez R-940; KUSUMOTO CHEMICALS).

Comparative Example 3

A conductive roll of Comparative Example 3 was produced in the same manner as in Example 1, except that 100 parts by mass of epichlorohydrin rubber (EPICHLOMER-CG-102; DAISO) was used instead of 100 parts by mass of the moderately high nitrile content type acrylonitrile-butadiene rubber.

Comparative Example 4

A conductive roll of Comparative Example 4 was produced in the same manner as in Example 3, except that 100 parts by mass of epichlorohydrin rubber (EPICHLOMER-CG-102; DAISO) was used instead of 100 parts by mass of the moderately high nitrile content type acrylonitrile-butadiene rubber.

Comparative Example 5

A conductive roll of Comparative Example 5 was produced in the same manner as in Comparative Example 4, except that the content of the di(2-ethylhexyl) phthalate (DOP) was 20 parts by mass.

Test Example 1

Evaluation of Roll Surface

The roll surface of each of the conductive rolls of the Examples and the Comparative Examples after shaping was observed with the naked eye. The results are shown in Table 1 and Table 2.

Test Example 2

Evaluation of Image

Each of the conductive rolls of Examples 1 to 2 and Comparative Examples 1 to 3 was mounted, as a charging roll, in a commercially available printer, and printing was performed in an LL environment (10° C., 30% RH), an NN environment (25° C., 50% RH), and an HH environment (35° C., 85% RH) The resulting printing products were each evaluated for the image obtained. The results are shown in Table 1 and Table 2. A good image was designated by ○, a fair image was designated by Δ, and a poor image was designated by X. The "fair image" represents a state in which the conductive roll poses no problem when used in an actual machine. The "poor image" represents a state in which the use of the conductive roll results in an uneven color density or deterioration.

Test Example 3

OPC Staining Test

Each of the conductive rolls of the Examples and the Comparative Examples was brought into contact with OPC (organic photoconductor) under a pressing force of 500 gf. The conductive roll, the OPC and a cartridge were held for 14 days in an environment at 50° C. and 90% RH. Then, the cartridge and the charging roll were installed in a printer, and an image was outputted. The images obtained were compared, and the surfaces of the OPC and the charging roll in contact with each other were observed microscopically. The results are shown in Table 1 and Table 2, as are the results of Test Example 1. A good image was designated by ○, a fair image was designated by Δ, and a poor image was designated by X. The "fair image" represents a state in which the conductive roll poses no problem when used in an actual machine. The "poor image" represents a state in which the use of the conductive roll results in an uneven color density or deterioration.

Test Example 4

Continuous Printing Test

Each of the conductive rolls of Examples 3 to 6 was mounted, as a charging roll, in a commercially available laser printer, and printing was performed continuously for 10,000 sheets in an HH environment (35° C., 85% RH). Then, printing was performed in an LL (10° C., 30% RH) environment, and the printing products were evaluated for the image. The results are shown in Table 2. A good image was designated by ○, a fair image was designated by Δ, and a poor image was designated by X. The "fair image" represents a state in which the conductive roll poses no problem when used in an actual machine. The "poor image" represents a state in which the use of the conductive roll results in an uneven color density or deterioration.

Summary of Results:

As shown in Table 1, the conductive rolls of Examples 1 and 2 shaped by extrusion each had a satisfactory roll surface. The images of the printing products obtained by printing using the conductive rolls of Examples 1 and 2 as charging rolls were good in the respective environments. In the OPC staining test, the conductive rolls of Examples 1 and 2 showed no staining of the OPC and no distortion of the roll surface, and gave good images of the printing products.

On the other hand, the conductive roll of Comparative Example 1 free from surface treatment had a satisfactory roll surface, and when it was used as a charging roll, the printing products obtained by printing in the NN and HH environments showed good images, but the image of the printing product obtain in the LL environment was poor. In the OPC staining test, the image of the printing product obtained by printing using the conductive roll of Comparative Example 1 as the charging roll was poor, and staining of the OPC was observed.

The conductive roll of Comparative Example 2 provided with the coating layer had a satisfactory roll surface. The images of the printing products by printing in the NN and HH environments with the use of the conductive roll as the charging roll were good, and the image of the printing product in the LL environment was fair. In the OPC staining test, staining of the OPC was not seen, but distortion caused upon contact with the OPC remained in the roll surface.

The conductive roll of Comparative Example 3, comprising epichlorohydrin rubber, had the rubber roll shaped by extrusion of rubber on to the shaft. Because of poor mold flow characteristics, the surface of the roll was considerably wavy, thus failing to yield a surface usable for a conductive roll.

As described above, it has been found that the conductive rubber member of the present invention, which has the conductive elastic layer formed by curing the rubber composition containing acrylonitrile-butadiene rubber and has the surface treatment layer as the superficial portion, can be produced satisfactorily by extrusion, and can maintain satisfactory characteristics in any environment, without damaging the surface of the photoconductor or undergoing wear of the surface of the rubber member, even when used in contact with the photoconductor.

by printing using the conductive roll as the charging roll was good. In the continuous printing test, the state of the OPC remained unchanged, and the image of the printing product was fair.

The conductive roll of Example 4, incorporating epichlorohydrin rubber, gave good images in any of the environments. In the continuous printing test, the state of the OPC remained unchanged, and the image of the printing product was fair.

The conductive roll of Example 5, incorporating epichlorohydrin rubber in the surface treating solution as well, had a lower resistance value in the LL environment than in Example 4, and showed flexibility. Probably for these reasons, the image was good even in the LL environment after printing of 10,000 sheets in the continuous printing test.

In connection with the conductive roll of Example 6 having the outer surface polished, the images of the printing products obtained by printing using the conductive roll as the charging roll were good in the respective environments. In the OPC staining test, neither the staining of the OPC nor the distortion of the roll surface was observed, and the image of the printing product was good. In the continuous printing test, the image of the printing product was good.

By contrast, the conductive roll of Comparative Example 4, which comprised epichlorohydrin rubber and had the rubber roll shaped by injection molding, showed a ripply pattern on the surface because of poor mold flow characteristics, and was unable to yield a surface usable for a conductive roll.

The conductive roll of Comparative Example 5 was successful in having a roll surface formed satisfactorily because of a higher plasticizer content than in Comparative Example 4. In the OPC staining test, however, staining of the OPC due to bleeding of the plasticizer was noted, and distortion caused upon contact with the OPC under pressure remained in the roll surface. The image of the printing product was poor.

As described above, it has been found that the conductive rubber member of the present invention can be produced

TABLE 1

|  |  | Ex. 1 | Ex. 2 | Comp. Ex. 1 | Comp. Ex. 2 | Comp. Ex. 3 |
|---|---|---|---|---|---|---|
| Roll surface after extrusion | | Good | Good | Good | Good | Poor |
| Evaluation of image | LL environment | ○ | ○ | X | Δ | — |
| | NN environment | ○ | ○ | ○ | ○ | — |
| | HH environment | ○ | ○ | ○ | ○ | — |
| Evaluation of image (Test Example 3) | | ○ | ○ | X | Δ | — |
| Staining of OPC | | Not stained | Not stained | Stained | Not stained | — |
| Distortion of roll | | Not distorted | Not distorted | Not distorted | Distorted | — |

○: Good image
Δ: Fair image
X: Poor image

As shown in Table 2, on the other hand, the conductive rolls of Examples 3 to 6 formed by injection molding each had a satisfactory roll surface.

The images of the printing products obtained by printing using the conductive roll of Example 3 as the charging roll were fair in the LL environment, and good in the NN environment and the HH environment. In the OPC staining test, neither the staining of the OPC nor the distortion of the roll surface was observed, and the image of the printing product satisfactorily by injection molding, and can maintain satisfactory characteristics in any environment, without damaging the surface of the photoconductor or undergoing wear of the surface of the rubber member, even when used in contact with the photoconductor. It has also been found that since the polyether-based polymer is used in the surface treating solution, satisfactory characteristics can be maintained for a longer term.

TABLE 2

|  | Ex. 3 | Ex. 4 | Ex. 5 | Ex. 6 | Comp. Ex. 4 | Comp. Ex. 5 |
|---|---|---|---|---|---|---|
| Roll surface after injection molding | Good | Good | Good | Good | Poor | Good |
| Polishing | — | — | — | Good | — | — |
| Evaluation of image LL environment | Δ | ○ | ○ | ○ | — | ○ |
| NN environment | ○ | ○ | ○ | ○ | — | ○ |
| HH environment | ○ | ○ | ○ | ○ | — | ○ |
| Evaluation of image (Test Example 3) | ○ | ○ | ○ | ○ | — | X |
| Staining of OPC | Not stained | Not stained | Not stained | Not stained | — | Stained |
| Distortion of roll | Not distorted | Not distorted | Not distorted | Not distorted | — | Distorted |
| Evaluation of image (Test Example 4) | Δ | Δ | ○ | ○ | — | — |

○: Good image
Δ: Fair image
X: Poor image

The embodiments of the present invention have been described above, but the invention is not limited to these embodiments. It should be understood that the invention can be subject to changes, substitutions or alterations without departing from the spirit and scope of the invention as defined by the appended claims.

What is claimed is:

1. A conductive rubber member having at least one conductive elastic layer, wherein
   the conductive elastic layer, which is at least an outermost layer, in contact with an opposing member during use is a cured product of a rubber composition having a conductivity imparting agent incorporated into a rubber base material consisting of acrylonitrile-butadiene rubber (NBR), and
   a superficial portion of the conductive elastic layer is a surface treatment layer formed by impregnating the conductive elastic layer with a surface treating solution containing at least an isocyanate component and an organic solvent.

2. The conductive rubber member according to claim 1, wherein the surface treating solution further contains at least one of carbon black and at least one polymer selected from an acrylic fluoropolymer and an acrylic silicone polymer.

3. The conductive rubber member according to claim 1, wherein the surface treating solution further contains a polyether-based polymer.

4. The conductive rubber member according to claim 3, wherein the polyether-based polymer has active hydrogen.

5. The conductive rubber member according to claim 4, wherein the polyether-based polymer is epichlorohydrin rubber.

6. The conductive rubber member according to claim 1, wherein the conductivity imparting agent is at least one of an electronic conductivity imparting agent and an ionic conductivity imparting agent.

7. The conductive rubber member according to claim 1, which is roll-shaped or blade-shaped.

* * * * *